United States Patent
Kouchiyama

(10) Patent No.: US 6,631,099 B1
(45) Date of Patent: Oct. 7, 2003

(54) MAGNETIC FIELD MODULATION MAGNETIC HEAD, MAGNETO-OPTICAL ELEMENT, OPTICAL PICKUP DEVICE, AND OPTICAL DISK DRIVE, IN WHICH FIRST AND SECOND MAGNETIC CORES ARE PLACED ON OPPOSITE SIDES OF MAGNETIC FIELD GENERATION COIL TO ACHIEVE LOW POWER CONSUMPTION AND HIGH EFFICIENCY

(75) Inventor: Akira Kouchiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/607,178

(22) Filed: Jun. 29, 2000

(30) Foreign Application Priority Data

Jul. 8, 1999 (JP) .......................................... P11-195090

(51) Int. Cl.[7] .............................................. G11B 21/00
(52) U.S. Cl. .................................. 369/13.33; 369/44.22
(58) Field of Search .......................... 369/13, 43, 44.11, 369/44.22, 13.22, 13.23, 13.32, 13.33

(56) References Cited

U.S. PATENT DOCUMENTS

| 4,862,437 | A | * | 8/1989 | Okada | 369/13.14 |
|---|---|---|---|---|---|
| 5,295,122 | A | * | 3/1994 | Murakami et al. | 369/13.17 |
| 5,485,435 | A | * | 1/1996 | Matsuda et al. | 369/13 |
| 5,978,320 | A | * | 11/1999 | Nakaoki et al. | 369/13.32 |
| 6,229,782 | B1 | * | 5/2001 | Wang et al. | 369/112.08 |
| 6,256,267 | B1 | * | 7/2001 | Hatam-Tabrizi | 369/13.28 |
| 6,307,818 | B1 | * | 10/2001 | Jerman et al. | 369/13.17 |
| 6,377,535 | B1 | * | 4/2002 | Chen et al. | 369/112.09 |

* cited by examiner

*Primary Examiner*—Aristotelis M. Psitos
(74) *Attorney, Agent, or Firm*—Oblon, Spivak, McClelland, Maier & Neustadt, P.C.

(57) ABSTRACT

A magnetic field modulation use magnetic head capable of applying a magnetic field to a recording layer of an optical disk with a low power consumption and a high efficiency and capable of preventing a disconnection of a magnetic field generation coil due to heat generation, provided with a magnetic field generation coil arranged so that it is substantially parallel to a magneto-optic recording layer of a magneto-optic recording medium, a first magnetic core formed at a side of the magnetic field generation coil 48 opposite to a magneto-optic recording medium, and a second magnetic core formed at a side of the magnetic field generation coil 48 the same as the magneto-optic recording medium, and a magneto-optical element, an optical pickup device, and an optical disk drive using the same.

17 Claims, 8 Drawing Sheets

MAGNETIC FIELD MODULATION MAGNETIC HEAD, MAGNETO-OPTICAL ELEMENT, OPTICAL PICKUP DEVICE, AND OPTICAL DISK DRIVE, IN WHICH FIRST AND SECOND MAGNETIC CORES ARE PLACED ON OPPOSITE SIDES OF MAGNETIC FIELD GENERATION COIL TO ACHIEVE LOW POWER CONSUMPTION AND HIGH EFFICIENCY

BACKGROUND OF THE INVENTION

1. Field of the Invention

The present invention relates to a magnetic field modulation use magnetic head, a magneto-optical element, and an optical pickup devices used for an optical disk drives for recording or playing back a magneto-optic signal to or from a magneto-optic recording medium and to such an optical disk drive.

2. Description of the Related Art

In recent years, the advances made in the technology for digitally recording moving pictures, static images, or other video data have led to large volumes of data being handled, so magneto-optic disk drives and other optical disk drives utilizing magneto-optic recording capable of further raising the recording density have spread in use in place of floppy disk drives and other magnetic disk drives which have been conventionally generally been widely utilized.

For example, when a magneto-optic disk drive, one type of optical disk drive, records data, it focuses a laser beam on a position on the magneto-optic disk for recording the data to make the temperature of the magnetic material (magneto-optic recording layer) at that position rise up to the Curie temperature and cancel out the coercive force corresponding to data already recorded at that position and further applies a magnetic field corresponding to the data to be newly recorded to that position (position at which the temperature has become the Curie temperature) to thereby record the data.

For example, in the Mint Disc (MD) system or the like which have been already put into practical use as optical disk drives for recording and playing back of information data with respect to a recording medium, here a magneto-optic disk, by a magnetic field modulation system, a magnetic field generation coil (magnetic head) for applying a magnetic field at the time of recording data is arranged at a position facing the optical pickup device emitting the laser beam across the disk.

The magnetic field generation coil and the optical pickup device move to positions for recording the data on the optical disk, then the magnetic field generation coil applies the magnetic field to the predetermined position and the optical pickup device emits the laser beam.

Further, in recent years, as an optical disk drive for recording and playing back of information data with respect to a recording medium, that is, magneto-optic disk, by the magnetic field modulation system, there have been proposed for example a near field optical disk drive made by Tera Stor Co. for recording and playback while arranging the optical disk and the optical lens at a distance between them becomes 200 nm or less, an optical hard disk drive made by Quinta Co. in which the optical lens is mounted on a floating type slider, and other optical disk drives arranging the optical disk and the optical lens or a slider mounting the optical lens or the like at a distance of 200 nm or less to make it possible to raise the numerical aperture NA and further raise the recording density.

In the above near field optical disk drive or other optical disk drive raising the numerical aperture NA, in order to secure an optical skew margin when the numerical aperture NA is raised and a margin of the thickness of the optical disk substrate, the recording layer is arranged on the optical lens side of the optical disk substrate.

In the above optical disk drive, when arranging the magnetic field generation coil at the side of the optical disk opposite to the optical lens, if the inductance of the magnetic field generation coil is made small, that is, the diameter of the magnetic field generation coil is made small, in order to enable a high speed transfer of a large volume of data such as a video signal, it becomes difficult to apply an effective magnetic field of for example about 200 Oe to the recording layer of the optical disk since the spread of the magnetic field is large. Accordingly, in order to make it possible to transfer a large volume of data at a high speed, it becomes necessary to arrange the magnetic field generation coil for applying the magnetic field to the recording layer of the optical disk on the same side of the optical disk as the optical lens.

Further, by integrally constituting the magnetic field generation coil and the optical lens, a reduction of the thickness of the optical disk drive has become possible.

An explanation will be made next of a magneto-optical element integrally constituting the magnetic field generation coil and the optical lens.

FIG. 9 is a plan view of the configuration of a magnetic coil 46 part of a magneto-optic head portion according to the related art, which can be applied as a magneto-optic head of a magneto-optic disk system.

A spiral-shaped thin film coil 48 having a size of for example an inner diameter of 50 to 200 $\mu$m and an outer diameter of about 350 to 400 $\mu$m is formed on the periphery of an emitting portion 44d of a coil supporting substrate 44 on a main surface of the coil supporting substrate 44 facing the magneto-optic disk. The thin film coil 48 is covered by an insulation layer 49.

Further, a magnetic core 47a is formed on the coil supporting substrate 44 beneath of the thin film coil 48. The magnetic core 47a acts also as an electrode takeout portion inside the spiral shaped thin film coil 48.

The emitting portion 44d region is the region from which the laser beam L emitted from a not illustrated semiconductor laser is emitted. In this region, an aperture portion Ha is formed in the magnetic core 47a and becomes the optical axis of the laser beam L.

The magneto-optical element integrally constituting the magnetic field generation coil and the optical lens emits the laser beam L from the emitting portion 44d to the magneto-optic recording layer of the magneto-optic disk and, at the same time, can apply a magnetic field generated by the thin film coil 48 and therefore can record and play back information with respect to the magneto-optic recording layer of the magneto-optic disk.

Summarizing the problems to be solved by the invention, in the optical disk drives of the MD and other magnetic field modulation systems which have already been put into a practical use, however, a bulk head is used for the magnetic head for generating the modulation magnetic field, so it has been difficult to raise the modulation frequency.

Further, in a magneto-optical element raising the numerical aperture by integrally constituting the magnetic field generation coil and the optical lens shown FIG. 9, It is necessary to provide the magnetic field generation coil at an outer circumferential portion of the emitting portion region serving as the optical axis of the laser beam and it is necessary to set the diameter of the magnetic field generation coil to a predetermined value or more, therefore it was not possible to configure the magnetic head to improve the efficiency of the magnetic circuit as was used in for example magnetic recording and it was difficult to apply the magnetic field to the recording layer of the optical disk with a low power consumption and a high efficiency.

Further, in order to generate the required magnetic field at the time of recording, a very large current must be passed through the magnetic field generation coil, therefore the amount of heat generated in the magnetic field generation coil becomes large, and, in the worst case, disconnection of the magnetic field generation coil has been sometimes induced.

SUMMARY OF THE INVENTION

An object of the present invention is to provide a magnetic field modulation use magnetic head, a magneto-optical element, an optical pickup device, and an optical disk drive capable of applying a magnetic field to the recording layer of an optical disk with a low power consumption and a high efficiency and capable of preventing the disconnection of the magnetic field generation coil due to heat generation.

To attain the above object, according to a first aspect of the present invention, there is provided a magnetic field modulation use magnetic head for applying a magnetic field to a magneto-optic recording layer of a magneto-optic recording medium, comprising a magnetic field generation coil arranged so that a direction of a recording current is substantially parallel to a plane of said magneto-optic recording layer, a first magnetic core formed at a side of said magnetic field generation coil opposite to said magneto-optic recording medium, and a second magnetic core formed at a side of said magnetic field generation coil the same as said magneto-optic recording medium.

In the magnetic field modulation use magnetic head of the present invention, preferably an aperture portion is formed in said first magnetic core at a center region of said magnetic field generation coil, more preferably, aperture portions are formed in said first magnetic core and said second magnetic core at the center region of said magnetic field generation coil, still more preferably, a diameter of the aperture portion of said second magnetic core is made larger than a diameter of the aperture portion of said first magnetic core.

Further, preferably part of said first magnetic core and part of said second magnetic core are magnetically connected at an outer circumferential portion of the coil or the like.

The magnetic field modulation use magnetic head of the present invention has magnetic cores above and below the magnetic field generation coil, so the efficiency of the magnetic circuit rises, it is possible to apply the magnetic field to the recording layer of the optical disk with a low power consumption and a high efficiency, and the disconnection of the magnetic field generation coil due to heat generation can be prevented.

According to a second aspect of the present invention, there is provided a magneto-optical element used in at least recording or playback of information with respect to a magneto-optic recording layer of a magneto-optic recording medium, comprising a lens for focusing light emitted to the magneto-optic recording layer of the magneto-optic recording medium and a magnetic field generating means formed at a surface of said lens facing said magneto-optic recording medium, said magnetic field generating means having a magnetic field generation coil arranged substantially parallel to the magneto-optic recording medium, a first magnetic core formed at a side of said magnetic field generation coil opposite to said magneto-optic recording medium, and a second magnetic core formed at a side of said magnetic field generation coil the same as said magneto-optic recording medium.

In said magneto-optical element of the present invention, preferably said magnetic field generating means is formed on a supporting substrate made of an optical member constituting said lens, and said supporting substrate is fixed to an optical member having a spherical shape constituting said lens.

Further, preferably, said lens Is constituted by a group of a plurality of lenses arranged on an optical axis of the light emitted to said magneto-optic recording medium, more preferably, said lens is constituted by a group of two lenses arranged on the optical axis of the light emitted to said magneto-optic recording medium.

In said magneto-optical element of the present invention, preferably aperture portions are formed in said first magnetic core and said second magnetic core at the center region of said magnetic field generation coil serving as a optical axis of the light emitted to said magneto-optic recording medium, more preferably a diameter of the aperture portion of said second magnetic core is made larger than a diameter of the aperture portion of said first magnetic core.

Further, preferably part of said first magnetic core and part of said second magnetic core are magnetically connected at the outer circumferential portion of the coil or the like.

Since the magneto-optical element of the present invention has the magnetic field generation coil and the magnetic cores above and below it as the magnetic field generating means on the surface of the lens facing the magneto-optical recording medium, the efficiency of the magnetic circuit rises, it is possible to apply the magnetic field to the recording layer of the optical disk with a low power consumption and a high efficiency, and the disconnection of the magnetic field generation coil due to heat generation can be prevented.

According to a third aspect of the present invention, there is provided an optical pickup device used at least in recording or playback of information with respect to a magneto-optic recording layer of a magneto-optic recording medium, comprising a light source for emitting light toward the magneto-optic recording medium; a magneto-optical element having a lens which Is arranged on an optical axis of the light emitted from said light source and focusing said light to the magneto-optic recording layer of said magneto-optic recording medium and a magnetic field generating means which has a magnetic field generation coil arranged substantially parallel to said magneto-optic recording medium, a first magnetic core formed at a side of said magnetic field generation coil opposite to said magneto-optic recording medium, and a second magnetic core formed at a side of said magneto-optic generation coil the same as said magneto-optic recording medium and which is formed at a surface of said lens facing said magneto-optic recording medium; and a light receiving means for receiving a returning light reflected at said magneto-optic recording layer.

In said optical pickup device of the present invention, preferably said magnetic field generating means Is formed on a supporting substrate made of the optical member constituting said lens, and said supporting substrate is fixed to an optical member having a spherical shape constituting said lens.

Further, preferably, said lens is constituted by a group of a plurality of lenses arranged on the optical axis of the light emitted to said magneto-optic recording medium, more preferably, said lens is constituted by a a group of two lenses arranged on the optical axis of the light emitted to said magneto-optic recording medium.

In said optical pickup device of the present invention, preferably aperture portions are formed in said first magnetic core and said second magnetic core at the center region of said magnetic field generation coil serving as the optical axis of the light emitted to said magneto-optic recording medium, more preferably a diameter of the aperture portion of said second magnetic core is made larger than a diameter of the aperture portion of said first magnetic core.

Further, preferably part of said first magnetic core and part of said second magnetic core are magnetically connected at an outer circumferential portion of the coil or the like.

Since the optical pickup device of the present invention has the magnetic field generation coil and the magnetic cores above and below it as the magnetic field generating means on the surface, facing the magneto-optical recording medium, of the lens for focusing the light to the magneto-optic recording layer of the magneto-optic recording medium, the efficiency of the magnetic circuit rises, it is possible to apply the magnetic field to the recording layer of the optical disk with a low power consumption and a high efficiency, and the disconnection of the magnetic field generation coil due to heat generation can be prevented.

According to a fourth aspect of the present invention, there is provided an optical disk drive for at least recording or playing back information with respect to a magneto-optic recording layer of a magneto-optic recording medium, comprising a rotation driving means for driving the magneto-optic recording medium to rotate, a light source for emitting light toward said magneto-optic recording medium, a magneto-optical element having a lens which is arranged on an optical axis of the light emitted from said light source and focuses said light to the magneto-optic recording layer of said magneto-optic recording medium, and a magnetic field generating means which has a magnetic field generation coil arranged substantially parallel to said magneto-optic recording medium, a first magnetic core formed at a side of said magnetic field generation coil opposite to said magneto-optic recording medium, and a second magnetic core formed at a side of said magneto-optic generation coil the same as said magneto-optic recording medium and which is formed at a surface of said lens facing said magneto-optic recording medium, a light receiving element for receiving a returning light reflected at said magneto-optic recording layer, and a signal processing circuit for generating a predetermined signal on the basis of the returning light received by said light receiving element.

Said optical disk drive of the present invention preferably further has an adjustment mechanism for adjusting a relative position of said magneto-optical element with respect to said magneto-optic recording medium and a control unit for controlling said adjustment mechanism according to the signal created in said signal processing circuit.

In said optical disk drive of the present invention, preferably said magnetic field generating means is formed on a supporting substrate made of an optical member constituting said lens and said supporting substrate to fixed to an optical member having a spherical shape constituting said lens, and more preferably, said lens is constituted by a group of a plurality of lenses arranged on the optical axis of the light emitted to said magneto-optic recording medium.

Further, preferably said lens is constituted by a group of two lenses arranged on the optical axis of the light emitted to said magneto-optic recording medium.

In said optical disk drive of the present invention, preferably aperture portions are formed in said first magnetic core and said second magnetic core at the center region of said magnetic field generation coil serving as the optical axis of the light emitted to said magneto-optic recording medium, more preferably a diameter of the aperture portion of said second magnetic core is made larger than a diameter of the aperture portion of said first magnetic core.

Further, preferably part of said first magnetic core and part of said second magnetic core are magnetically connected at the outer circumferential portion of the coil or the like.

Since the optical disk drive of the present invention has the magnetic field generation coil and the magnetic cores above and below it as the magnetic field generating means on the surface, facing the magneto-optical recording medium, of the lens for focusing the light to the magneto-optic recording layer of the magneto-optic recording medium, the efficiency of the magnetic circuit rises, it is possible to apply the magnetic field to the recording layer of the optical disk with a low power consumption and a high efficiency, and the disconnection of the magnetic field generation coil due to heat generation can be prevented.

BRIEF DESCRIPTION OF THE DRAWINGS

The above and other object and features of the present invention will be more apparent from the following description of the preferred embodiments given with reference to the accompanying drawings, wherein.

DESCRIPTION OF THE PREFERRED EMBODIMENTS

Below, embodiments of the present invention will be explained in detail by using the drawings.

The present embodiment was applied to a recording and/or playback device (hereinafter referred to as a magneto-optic disk drive) for recording or playing back data with respect to a magneto-optic disk as an optical recording medium.

First Embodiment

Figure 1:
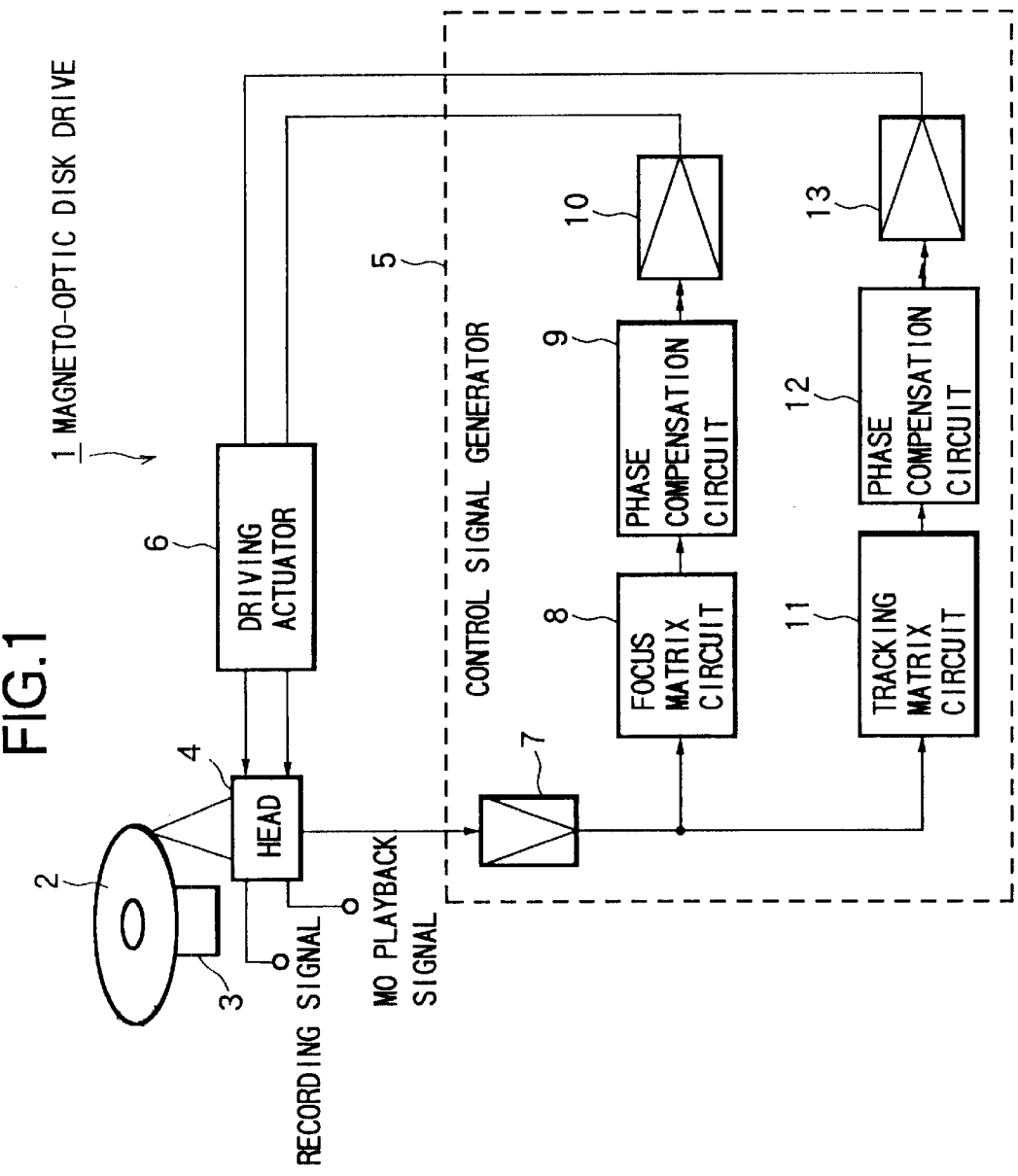
FIG. 1 is a schematic view of the configuration an a magneto-optic disk drive according to a first embodiment.

The optical disk drive according to the present embodiment is a magneto-optic disk drive for recording and/or playing back information signals with respect to a magneto-optic disk. FIG. 1 is a schematic view showing the configuration of the drive.

A magneto-optic disk drive 1 is provided with a spindle motor 3 for driving a magneto-optic disk 2 to rotate, a head 4 for recording a predetermined signal with respect to the magneto-optic disk 2 driven to rotate by this spindle motor 3 and, at the same time, outputting a light reception signal for reading a signal recorded on this magneto-optic disk 2 and creating an MO playback signal and a control signal, a control signal generator 5 receiving as its input the light reception signal output from the head 4 and generating the control signal, and driving actuators (focus actuator and tracking actuator) 6 for moving a magneto-optic head portion 25 in the head 4 in a diameter direction of the magneto-optic disk 2 or a direction for approaching or moving away from the magneto-optic disk 2 on the basis of the control signal supplied from the control signal generator 5.

The spindle motor 3 is connected to a not illustrated power source. When a drive current is supplied from this power source, the held magneto-optic disk 2 is driven to rotate at a predetermined speed.

When a recording signal is supplied from a not illustrated predetermined device, the head 4 emits light to the magneto-optic recording layer of the magneto-optic disk 2 and, at the same time, generates a magnetic field according to the recording signal to record the predetermined signal at the position to which the light of the magneto-optic recording layer is emitted. Further, the head 4 emits light to the magneto-optic recording layer of the magneto-optic disk 2 and detects the returning light so as to read the data recorded on the magneto-optic disk 2, outputs the same as the MO playback signal, and supplies the light reception signal to the control signal generator 5.

The control signal generator 5 is provided with a focus matrix circuit 8, a tracking matrix circuit 11, phase compensation circuits (9 and 12), and amplifiers (7, 10, and 13).

The focus matrix circuit 8 generates a focus error signal on the basis of the light reception signal supplied from the head 4 via the amplifier 7 and supplies this focus error signal to the phase compensation circuit 9.

The phase compensation circuit 9 performs phase compensation for the focus error signal supplied from the focus matrix circuit 8 and supplies the phase compensated signal via the amplifier 10 to the focus actuator between the driving actuators 6 as a control signal for moving the magneto-optic head portion 25 in the head 4 in the optical axis direction and performing the focus control.

On the other hand, the tracking matrix circuit 11 generates a tracking error signal on the basis of the light reception signal supplied from the head 4 via the amplifier 7 and supplies this tracking error signal to the phase compensation circuit 12.

The phase compensation circuit 12 performs phase compensation on the tracking error signal supplied from the tracking matrix circuit 11 and supplies the phase compensated signal via the amplifier 13 to the tracking actuator between the driving actuators 6 as a control signal for moving the magneto-optic head portion 25 in the head 4 in the diameter direction of the magneto-optic disk 2 and performing the tracking control.

The driving actuator 6 moves the magneto-optic head portion 25 in the head 4 in the optical axis direction (direction approaching or moving away from the magneto-optic disk) on the basis of the focus error signal supplied from the focus matrix circuit 8 via the phase compensation circuit 9 and the amplifier 10 and controls the focus.

Further, the driving actuator 6 moves the magneto-optic head portion 25 in the head 4 in the diameter direction of the magneto-optic disk 2 on the basis of the tracking error signal supplied from the tracking matrix circuit 11 via the phase compensation circuit 12 and the amplifier 13 and controls the tracking.

By the focus servo and tracking servo as described above, the light can be precisely emitted to the magneto-optic recording layer of the magneto-optic disk 2. By detecting the returning light thereof, the data recorded on the magneto-optic disk 2 can be read and output as the MO playback signal.

Figure 2:
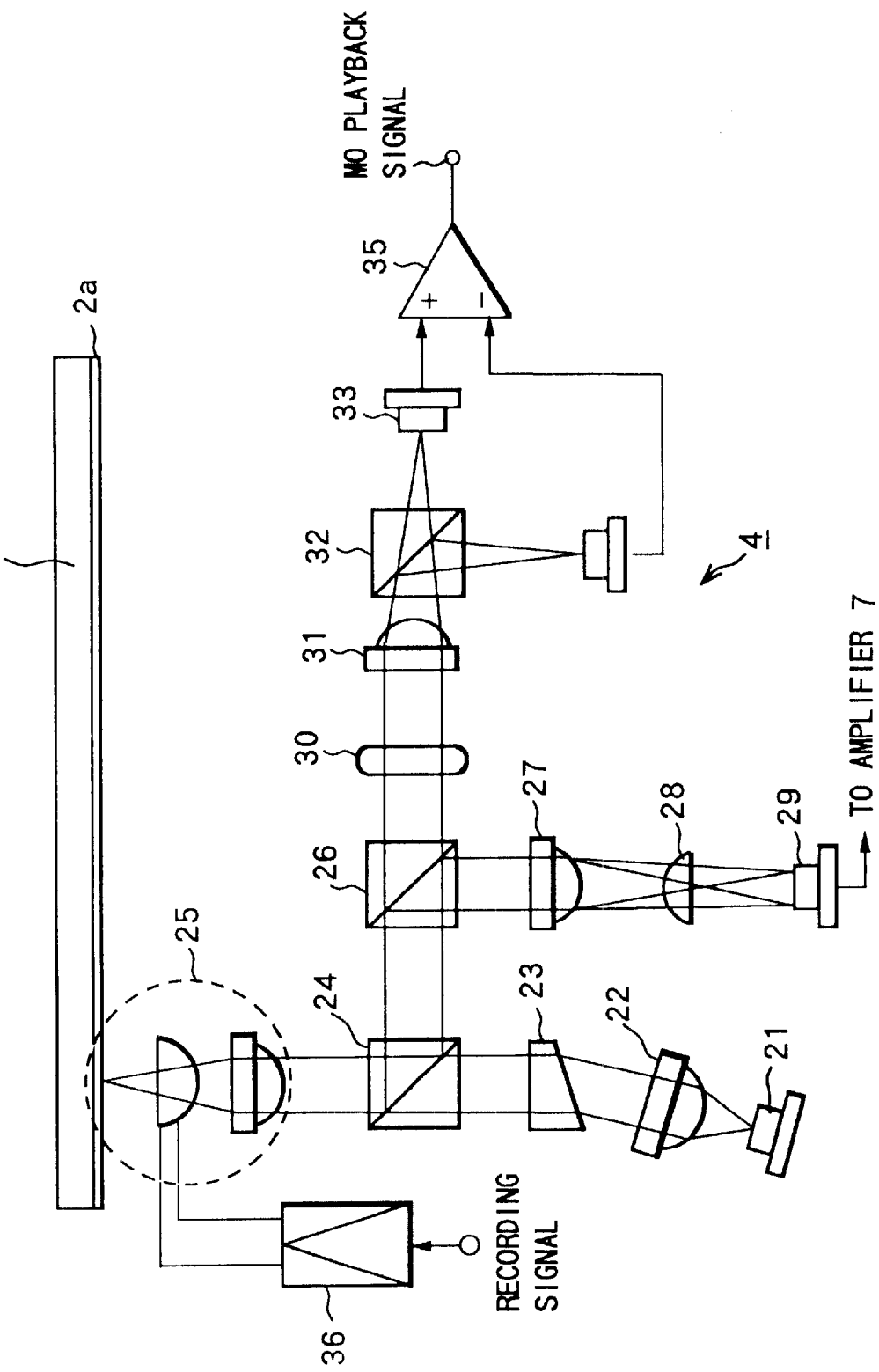
FIG. 2 is a schematic view of the configuration of an optical pickup device (head) according to the first embodiment.

FIG. 2 is a schematic view of the configuration of the head (optical pickup device) 4 of the magneto-optic disk drive shown in FIG. 1.

This is provided with a semiconductor laser 21 for emitting a predetermined laser beam and is arranged so that the laser beam emitted from this semiconductor laser 21 first strikes a collimator lens 22.

The collimator lens 22 adjusts the laser beam emitted from the semiconductor laser 21 to a collimated beam and is arranged so that the laser beam transmitted through this collimator lens 22 strikes a first beam splitter 24 via a shaping prism 23 in a state where it is shaped to a collimated beam.

The first beam splitter 24 is arranged so as to transmit the laser beam from the shaping prism 23 toward an optical element (magneto-optic head portion) 25 having an object lens comprising two lenses and a not illustrated thin film coil and, at the same time, reflect the laser beam (returning light) reflected at a magneto-optic recording layer 2a of the magneto-optic disk 2 and passing through the magneto-optic head portion 25 toward a second beam splitter 26.

The magneto-optic head portion 25 is arranged so that the object lens focuses the laser beam from the first beam splitter 24 and emits this to the magneto-optic recording layer 2a of the magneto-optic disk 2 and, at the same time, so that, at the time of data recording, the thin film coil applies a magnetic field having an intensity corresponding to the recording signal supplied via an amplifier 36 to the position of the magneto-optic recording layer 2a to which the laser beam is emitted.

Further, this magneto-optic head portion 25 is arranged so as to make the laser beam (returning light) reflected at the magneto-optic recording layer 2a of the magneto-optic disk 2 strike the first beam splitter 24.

The returning light striking the first beam splitter 24 Is reflected at the first beam splitter 24 as mentioned above and strikes the second beam splitter 26.

The second beam splitter 26 is arranged so as to reflect the returning light reflected at the first beam splitter 24 toward a first focusing lens 27 with a predetermined proportion and, at the same time, transmit the same toward a second focusing lens 31 via a ½ wavelength plate 30.

The first focusing lens 27 is arranged so as to change the returning light of the collimated beam reflected at the second beam splitter 26 to the focused light and make this focused light strike a first photodetector 29 via a cylindrical lens 28 for imparting astigmatism.

The first photodetector 29 has for example four light receiving portions, converts the returning light striking each light receiving portion to an electric signal (light reception signal), and supplies these to the amplifier 7 in the control signal generator 5 shown FIG. 1 for use for the creation of the control signal for the focus servo and the tracking servo.

The second focusing lens 31 is arranged so as to change the returning light of the collimated beam supplied from the second beam splitter 26 via the ½ wavelength plate 30 to the focused light and make this strike a third beam splitter 32.

The third beam splitter 32 transmits part of the returning light changed to the focused light by the second focusing lens 31 toward the second photodetector 33 and, at the same time, reflects the other part of the returning light toward a third photodetector 34.

A second photodetector 33 and the third photodetector 34 are arranged so as to convert the returning light incident from the third beam splitter 32 to electric signals corresponding to the amounts of the light and supply them to a differential amplifier 35.

The differential amplifier 35 calculates a difference between the electric signal supplied from the second photodetector 33 and the electric signal supplied from the third photodetector 34 and supplies the calculation result as an MO playback signal to a not illustrated predetermined device.

The head 4 of the magneto-optic disk drive is constituted as described above.

In the magneto-optic disk drive, it is possible to record a predetermined information signal on the magneto-optic disk 2 or read (play back) a predetermined information signal from the magneto-optic disk 2. The recording and playback operation of this magneto-optic disk drive 1 will be explained next.

When recording predetermined data on the magneto-optic disk 2, this magneto-optic disk drive 1 drives the magneto-optic disk 2 mounted on the spindle motor 3 to rotate and, at the same time, a laser beam is emitted from the semiconductor laser 21 of the head 4.

The laser beam emitted from the semiconductor laser 21 strikes the magneto-optic head portion 25 via the collimator lens 22, shaping lens 23, and the first beam splitter 24. Then, the laser beam made to strike the magneto-optic head portion 25 is focused by the object lens comprising two lenses of the magneto-optic head portion 25, passes through the center hole of the thin film coil provided in the magneto-optic head portion 25, and is emitted to the magneto-optic recording layer 2a of the magneto-optic disk 2.

The magneto-optic disk drive 1, by emitting the laser beam to the magneto-optic recording layer 2a of the magneto-optic disk 2 in this way, makes the magnetic material at the position to which this laser beam is emitted rise up to the Curie temperature or the compensation temperature or more and cancel out the magnetization of that position.

Next, in the magneto-optic disk drive 1, when a recording signal modulated corresponding to the data to be recorded is supplied via an amplifier 36 to the magneto-optic head portion 25, the thin film coil provided in the magneto-optic head portion 25 generates a magnetic field corresponding to that recording signal. This magnetic field is applied to the position of the magneto-optic recording layer 2a of the magneto-optic disk 2 to which the laser beam is emitted.

The magneto-optic disk drive 1 records predetermined data (recording signal) on the magneto-optic disk 2 in this way. At the time of this recording operation, the heat generated in the thin film coil is dissipated from a wiring member etc. provided in the magneto-optic head portion 25.

Note that, even at this recording, the magneto-optic disk drive 1 is made to perform the focus servo and the tracking servo as described above.

When playing back the data recorded on the magneto-optic disk 2, in the same way as the recording operation, this magneto-optic disk drive 1 drives the magneto-optic disk 2 mounted on the spindle motor 3 to rotate and, at the same time, emits a laser beam from the semiconductor laser 21 of the head 4.

The laser beam emitted from the semiconductor laser 21 strikes the magneto-optic head portion 25 via the collimator lens 22, shaping lens 23, and the first beam splitter 24. Then, this is focused by a rear lens 42 and a front lens 41 of the magneto-optic head portion 25, passes through the center hole of the coil portion 46, and is emitted to the magneto-optic recording layer 2a of the magneto-optic disk 2. The returning light reflected at the magneto-optic recording layer 2a strikes the second photodetector 33 and the third photodetector 34 via the second beam splitter 26, ½ wavelength plate 30, second focusing lens 31, and the third beam splitter 32, and is detected. Polarized planes of this returning light from the magneto-optic recording layer 2a rotate in opposite directions to each other by an orientation (corresponding to the value of the recorded data) of the magnetization of the magneto-optic recording layer 2a due to the Kerr effect. Then, this returning light from the magneto-optic recording layer 2a strikes the second photodetector 33 and the third photodetector 34 via the third beam splitter 32, whereby the rotation angle (Kerr rotation angle) seen between the orientation of the polarized plane thereof and the orientation of the polarized plane of the light emitted to the magneto-optic recording layer 2a is converted to the change of the intensity of the light, and this intensity change Is detected.

The second photodetector 33 and the third photodetector 34 output electric signals corresponding to the intensities of the incident returning lights to the differential amplifier 35. The differential amplifier 35 calculates the difference of the outputs of the second photodetector 33 and the third photodetector 34 and outputs the same as the MO playback signal.

Note that, the magneto-optic disk drive 1 is made to perform the focus servo and the tracking servo as described above even at this playback.

When playing back data recorded on the magneto-optic disk, the data recorded on the magneto-optic disk can be played back with super resolution by utilizing the magnetic field of the thin film coil provided in the magneto-optic head portion, for example, by the method of using as the magneto-optic disk a magneto-optic disk configured with a multilayer magnetic layer comprising a playback layer or the like provided over a recording layer, emitting a laser beam for playback to align the magnetic charge in the region at which the temperature becomes the predetermined temperature or more with the orientation of the magnetic field generated by the thin film coil provided in the magneto-optic head portion, and using the region having a temperature becoming the predetermined temperature or more of the laser beam spot as a mask region to improve the resolution of the playback or a method of aligning the orientation of the magnetic charge of the playback layer with the orientation of the magnetic field generated by the thin film coil provided in the magneto-optic head portion in advance, emitting the laser beam for playback to link the magnetic charge in the region having the temperature which becomes the predetermined temperature or more with the orientation of the magnetic charge of the recording layer, and using the region except for the region in the laser beam spot in which the temperature becomes the predetermined temperature or more as the mask region to improve the resolution of playback.

Figure 3:
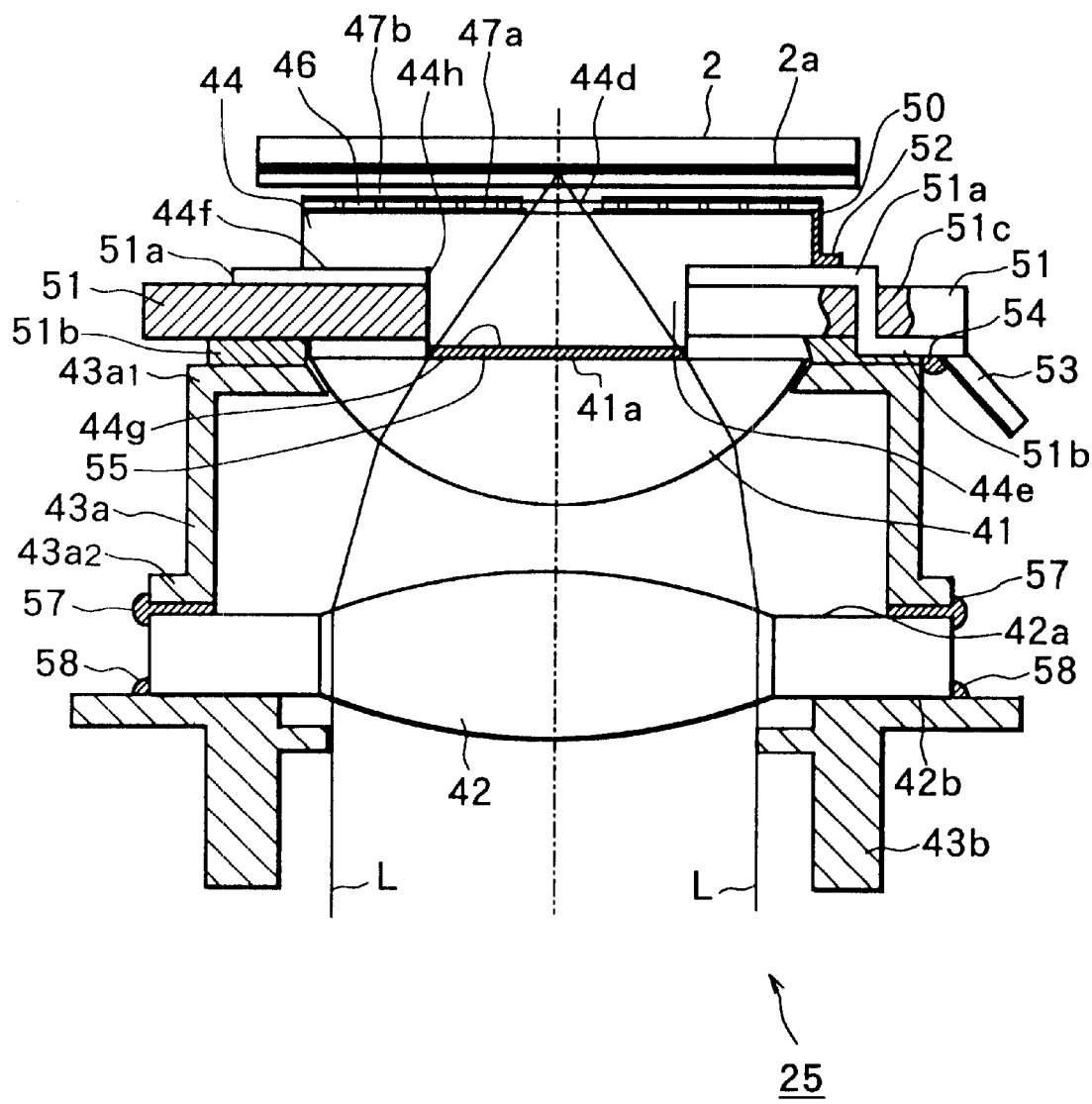
FIG. 3 is a schematic view of the configuration of a magneto-optic head portion according to the first embodiment.

FIG. 3 is a schematic view of the configuration of magneto-optic head used in the magneto-optic disk drive of the present embodiment and corresponds to an enlarged view of the magneto-optic head 25 part in FIG. 2.

The magneto-optic head portion 25 is provided with lenses 41 and 42 for focusing the light from the light source to the magneto-optic recording layer 2a of the magneto-optic disk 2; a coil supporting substrate 44; a spiral shaped coil portion 46 comprising a magnetic field generation element which is arranged at a surface of the coil supporting substrate 44, which is attached to the surface of the lens 41 facing the magneto-optic disk 2, facing the magneto-optic disk 2, and is supplied with current to generate a magnetic field and for example is of a size of an inner diameter of 50 to 200 µm and an outer diameter of 350 to 400 µm; and a wiring member 51 which is attached to the coil supporting substrate 44 with a predetermined distance from the coil portion 46, has an end portion on the optical axis side which does not obstruct the optical path of the light L, and is located inside the outer circumferential end of the coil supporting substrate 44.

Further, on the coil supporting substrate 44, a first magnetic core 47a is provided below the coil portion 46 (opposite side to the magneto-optic disk 2 side) and a second magnetic core 47b is provided above the coil portion 46 (on the magneto-optic disk 2 side).

For example, the first magnetic core is formed serving also as the electrode takeout portion inside the spiral-shaped coil portion 46.

The above two lenses 41 and 42 arranged on the optical path of the laser beam are constituted as objective lenses for focusing the laser beam emitted from the semiconductor laser 21. Note that, in the following explanation, among these two lenses, the lens arranged at the magneto-optic disk 2 side will be referred to as the front lens 41, and the other lens will be referred to as the rear lens 42.

The front lens 41 and the rear lens 42 are both comprised of white sheet glass, blue sheet glass, quartz glass, or the like transparent to the transmission light used shaped to predetermined shapes and are arranged on the optical path of the laser beam transmitted through the first beam splitter 24 while being supported by lens holders 43a and 43b. Particularly, the front lens 41 is formed to a semispherical state and is supported at the lens holders 43a and 43b so that the circular plane faces the magneto-optic disk 2. Note that the spherical shape of the front lens 41 is optimized according to the shape and arrangement position of the rear lens 42 and a substrate thickness and a refractive index of the magneto-optic disk 2 so that the laser beam emitted to the magneto-optic recording layer 2a is not influenced by spherical aberration.

Further, the front lens 41 and the rear lens 42 are integrally moved in the diameter direction of the magneto-optic disk 2 and the direction approaching or moving away from the magneto-optic disk 2 by a driving actuator in a state where they are supported by the lens holders 43a and 43b, whereby the tracking servo and the focus servo can be carried out.

Note that, when performing the focus servo, the front lens 41 or the rear lens 42 are operated to move in the direction approaching or moving away from the other lens and thereby correct the spherical aberration.

The magneto-optic head portion 25 is provided with the coil supporting substrate 44 located at the magneto-optic disk 2 side of the front lens 41.

The coil supporting substrate 44 is provided with the coil portion 46 on the surface facing the magneto-optic disk 2. The center part thereof is defined as the emitting portion 44d for emitting the light. Namely, the surface of the coil supporting substrate 44 facing the magneto-optic disk 2 is provided with the coil portion 46 formed with a center hole so as to secure the optical path of the light emitted from the emitting portion 44d.

Further, the coil supporting substrate 44 is formed on its back surface with a convex portion 44e. The wiring member 51 is attached to a back surface 44f of the coil supporting substrate 44 constituting the outer circumferential part of this convex portion 44e. Here, the convex portion 44e is for example given a cross-section in the radius direction of the optical axis of the laser beam L comprising a substantially circular shape of a diameter determined so that the optical path of the laser beam L can be secured. The height of the convex portion 44e in the optical axis direction is set higher than the thickness of the wiring member 51 in the optical axis direction, that is, set to a height so that a slight space is formed between the related wiring member 51 and the front lens 41 when the wiring member 51 is attached to the coil supporting substrate 44.

This coil supporting substrate 44 is formed by for example the same material as that for the front lens 41 mentioned above, that is, is formed by a glass material such as white sheet glass, blue sheet glass, or quartz glass.

The wiring member 51 is formed to substantially a flat plate shape and is constituted as a so-called two-sided substrate having conductive patterns (51a, 51b) at the surface facing the magneto-optic disk 2 and at its back surface. This wiring member 51 is formed so that its outside diameter is larger than the outside diameters of the coil supporting substrate 44 and the front lens 41 and has a center hole 44h formed at substantially the center. The wiring member 51 has the convex portion 44e mentioned above given substantially the same diameter as that of the center hole 44h located inside it and is attached to the coil supporting substrate 44.

The conductive patterns (51a, 51b) are formed on the wiring member 51 with parts located outward from the outer circumferential ends of the coil supporting substrate 44 and the front lens 41 in the state attached to the lens supporting substrate. Namely, the conductive patterns (51a, 51b) are constituted so that they contact the back surface of the coil supporting substrate 44 in their inside parts and have outside parts located in the outer circumferential direction from the outer circumferential ends of the coil supporting substrate 44 and the front lens 41.

These conductive patterns (51a, 51b) are formed by using copper or another material having a good heat conductivity and are electrically connected via for example through holes 51c provided in the wiring member 51. They are further connected to at least the coil portion 46 via solder 52 and connected to a power source wiring 53 via for example solder 54. The conductive patterns (51a, 51b) are used for supplying electric power to for example the coil portion 46.

Further, the conductive patterns (51a, 51b) are formed by a material having a high heat conductivity and can dissipate the heat generated in the thin film coil.

The coil supporting substrate 44 is attached to the front lens 41 so as to sandwich the wiring member 51 attached to the outer circumferential part of the back surface in this way. Specifically, this is attached by making the incident surface 44g of the convex portion 44e of the coil supporting substrate 44 which the laser beam from the front lens 41 strikes face an emitting surface 41a of the laser beam of the front lens 41 and filling a matching oil 55 optically having substantially the same refractive index as that of the related front lens 41 or the like between these facing surfaces. By this matching oil 55, the coil supporting substrate 44 and the front lens 41 are optically integrally constituted.

Then, the coil supporting substrate 44 and the front lens 41 optically integrally constituted in this way are attached to the lens holder 43a. Specifically, the back surface of the wiring member 51 and an attachment surface 43a1 provided at the end portion of the lens holder 43a facing the magneto-optic disk 2 are bonded by an adhesive 56.

Then, an attachment surface 43a2 at the other end of the lens holder 43a is attached to the outer circumferential portion 42a of the surface of the rear lens 42 facing the magneto-optic disk 2, whereby an objective lens comprised of the front lens 41 and the rear lens 42 joined integrally is constituted. Here, the attachment portion 43a2 of the lens holder 43a is attached to the rear lens 42 by an adhesive 57. Then, the lens holder 43b is attached to an outer circumferential portion 42b of the back surface of the rear lens 42 which the laser beam strikes by an adhesive 58 or the like.

Figure 4:
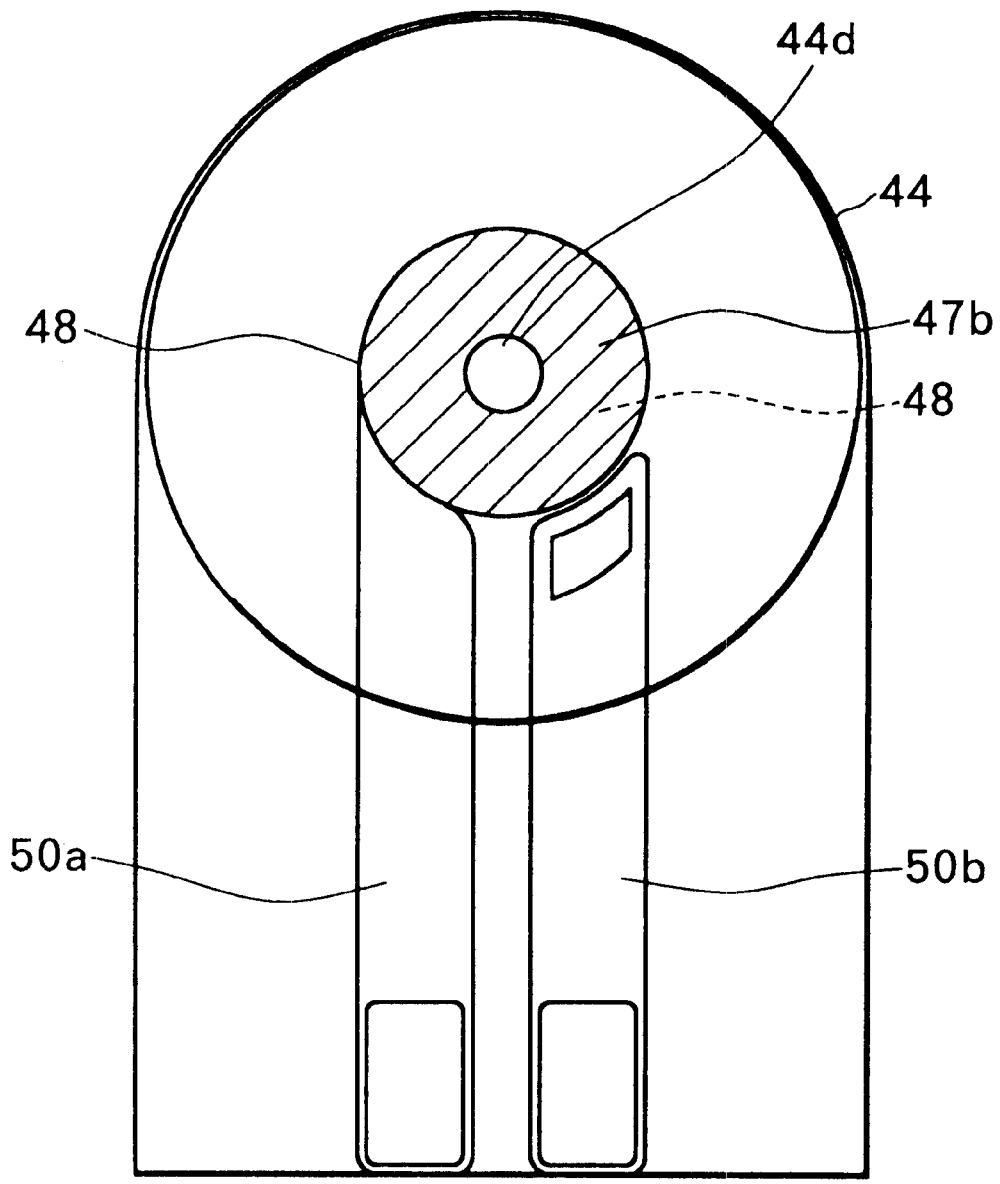
FIG. 4 is a plan view of a magnetic coil part of the magneto-optic head portion according to the first embodiment.

FIG. 4 is a plan view of the configuration of the magnetic coil 46 part of the magneto-optic head portion.

On the main surface of the coil supporting substrate 44 facing the magneto-optic disk 2 and on the periphery of the emitting portion 44d of the coil supporting substrate 44, a spiral-shaped thin film coil 48 having a size of about for example an inner diameter of 50 to 200 $\mu$m and an outer diameter of 350 to 400 $\mu$m is formed.

The thin film coil 48 is formed with electrode takeout portions (50a, 50b). It becomes possible to supply the power to the thin film coil 48 to generate a magnetic field. These electrode takeout portions (50a, 50b) are connected to for example the conductive patterns (51a, 51b) shown in FIG. 3.

Further, a not illustrated first magnetic core is formed below the thin film coil 48 (opposite side to the magneto-optic disk 2 side) on the coil supporting substrate 44, while the second magnetic core 47b is formed above the thin film coil 48 (magneto-optic disk 2 side). Here, the first magnetic core, thin film coil 48, and second magnetic core 47b are stacked on each other, so only the second magnetic core 47b of the uppermost layer is illustrated.

It is also possible to adopt a structure in which the first magnetic core is formed serving also as the electrode takeout portion of the thin film coil 48.

The magneto-optic head portion according to the present embodiment, when recording data, emits a laser beam focused by the rear lens and the front lens to a position for recording data on the magneto-optic disk to raise the temperature of the magnetic material at that position up to the Curie temperature and cancel out the coercive force corresponding to the data recorded at that position and further applies a magnetic field corresponding to the data to be newly recorded to that position (the position at which the temperature has become the Curie temperature) so as to enable the data to be recorded.

Figure 5A:
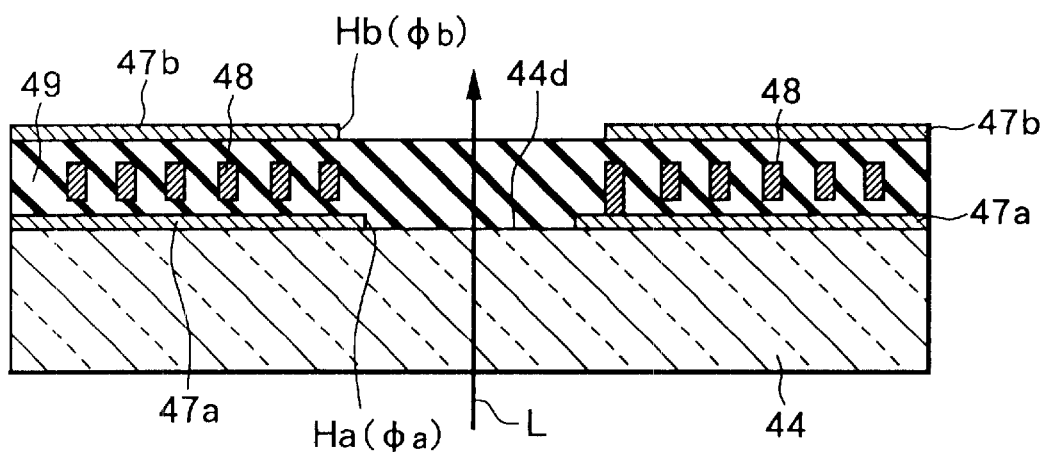
FIGS. 5A and 5B are sectional views of the configuration of a magnetic coil of the magneto-optic head portion according to the first embodiment.

FIG. 5A is a sectional view of the thin film coil 48 part.

On the main surface of the coil supporting substrate 44 facing the magneto-optic disk 2 and at the outer circumference of the emitting portion 44d of the laser beam, the spiral-shaped thin film coil 48 is formed covered by the insulation layer 49.

Further, the first magnetic core 47a is formed below the thin film coil 48 on the coil supporting substrate 44, while the second magnetic core 47b is formed above the thin film coil 48.

The first magnetic core 47a is configured to also act as the electrode takeout portion from the inner circumferential end portion of the spiral-shaped thin film coil 48.

The thin film coil 48 is arranged so that the center hole of the coil is located in the emitting portion 44d region of the laser beam of the coil supporting substrate 44 serving as the optical axis of the laser beam L. In the emitting portion 44d region, an aperture portion Ha having a diameter of $\phi$a is formed in the first magnetic core 47a, while an aperture portion Hb having a diameter of $\phi$b is formed in the second magnetic core 47b. Here, the diameter $\phi$b is made larger than the diameter $\phi$a.

As the material of the first and second magnetic cores (47a, 47b), for example an Ni—Fe alloy, a Co—based amorphous alloy, an Fe—Al—Si alloy, a laminate of an Fe—C alloy and Ni—Fe alloy, an Fe—Ta—N alloy, an Mn—Zn ferrite, or other material having a high permeability may be used. A wide range of materials can be used. It is also possible to use two or more types in combination.

The first and second magnetic cores (47a, 47b) can be formed for example by forming a film of a magnetic core material by a sputtering process, a CVD (chemical vapor deposition) process, a plating process, etc. and working them by etching or the like.

Note that when a magnetic core is used also as an electrode takeout portion, it is necessary to form it by a material having conductivity.

Note that in order to improve the adhesion of the first magnetic core 47a to the coil supporting substrate 44, it is also possible to form a bonding layer such as a Cr film on the main surface of the coil supporting substrate 44 and form the first magnetic core 47a on the coil supporting substrate 44 via this bonding layer.

This thin film coil 48 is made of a material having conductivity such as one type selected from among Cu, Ag, and Au or an alloy containing at least one type selected from among them. It is formed with a spiral shape formed of a pattern of a coil pattern of for example a width of 10 $\mu$m and a thickness of 10 $\mu$m wound by 10 turns with a pitch of 15 $\mu$m and having the emitting portion 44d of the coil supporting substrate 44 as a center hole. It may be grown to the predetermined thickness on the coil supporting substrate 44 by plating or may be formed by forming a film on the coil supporting substrate 44 to a predetermined thickness and then using a photolithography technique to etch this material having conductivity to a spiral shape having a center hole at the emitting portion 44d of the laser beam. Further it may be formed embedded in an insulation layer 49 made of an insulation material.

As the material of the insulation layer 49 for protection of the thin film coil 48 and an electrode S. use is made of for example a resist material, a polyimide, or an acrylic resin.

This thin film coil 48 is formed on the coil supporting substrate 44 so as to be substantially parallel to the magneto-optic recording layer 2a of the magneto-optic disk 2. Accordingly, the direction of the current flowing through this thin film coil 48 becomes substantially parallel to the magneto-optic recording layer 2a of the magneto-optic disk 2, and therefore the thin film coil 48 Is used so as to generate a magnetic field substantially perpendicular to the magneto-optic recording layer 2a of the magneto-optic disk 2 while penetrating through the center hole, generate a magnetic field corresponding to the recording signal supplied from a predetermined device, and apply this magnetic field to the position of the magneto-optic recording layer 2a of the magneto-optic disk 2 to which the laser beam is emitted.

According to the magneto-optical element provided with the magnetic coil part according to the present embodiment, since the magnetic field generation coil (thin film coil 48) and magnetic cores (the first magnetic core 47a and the second magnetic core 47b) above and below this are provided as the magnetic field generating means at the surface of the lens (coil supporting substrate 44) facing the magneto-optic recording medium, the efficiency of the magnetic circuit rises, It is possible to apply a magnetic field to the recording layer of the optical disk with a low power consumption and a high efficiency, there Is no reduction of the efficiency of the generated magnetic field due to the heat of the thin film coil particularly at the time of a high frequency, and disconnection of the magnetic field generation coil due to heat generation can be prevented.

Further, by making the diameter φb of the aperture portion Hb of the second magnetic core 47b larger than the diameter φa of the aperture portion Ha of the first magnetic core 47a, the efficiency of the magnetic circuit can be further raised without overly suppressing the spread of the magnetic field by the second magnetic core 47b.

Further, by using the magneto-optical element, it Is possible to construct an optical pickup device and an optical disk drive having a higher efficiency of the magnetic circuit and enabling application of a magnetic field to the recording layer of the optical disk with a low power consumption and with a high efficiency.

Figure 5B:
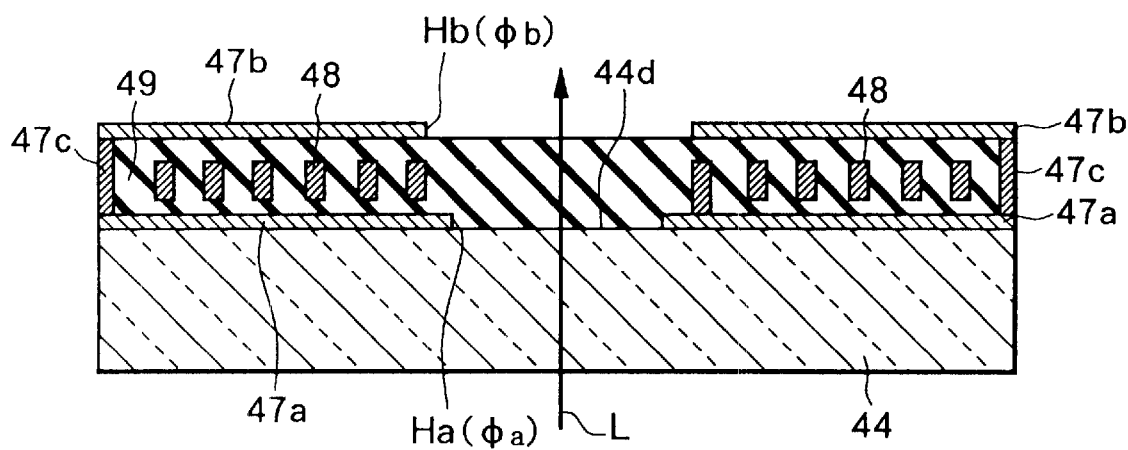

Further, in the present embodiment, for example, as shown FIG. 5B, by employing a structure in which the first magnetic core 47a and the second magnetic core 47b are magnetically connected, for example, a structure in which the first magnetic core 47a and the second magnetic core 47b are connected by a third magnetic core 47c at their peripheral portions, it is possible to further raise the magnetic circuit efficiency.

Giving a specific example of the construction, first a CoPdZr film serving as the first magnetic core was grown by a sputtering process on a white sheet glass substrate having a predetermined thickness and serving as the coil supporting substrate, then the CoPdZr film was shaped to a ring state having a center hole with a diameter of about 130 μm by an etching process and to thereby form the first magnetic core.

Next, an acrylic resin layer for insulating the first magnetic core and the thin film coil was formed over the first magnetic core. As this acrylic resin layer, use was made of one having photosensitivity. A via hole was formed by a photolithography process.

Next, an electrolytic plating process was used to form a Cu film acting as the thin film coil in a spiral shape connected to the first magnetic core at the via hole.

Next, an acrylic resin film was formed over the thin film coil to insulate the thin film coil and the second magnetic core and flatten the thin film coil forming surface, then a CoPdZr film serving as the second magnetic core was formed by a sputtering process. The CoPdZr film was shaped to a ring state having a center hole with a diameter of about 180 μm by an etching process to thereby form the first magnetic core.

The white sheet glass formed with the magnetic cores above and below a thin film coil in this way was cut into a predetermined size to prepare the magnetic head according to the present invention.

On the other hand, a magnetic head according to the related art different from the magnetic head according to the present invention in only the point that the second magnetic core was not formed was prepared.

Figure 6:
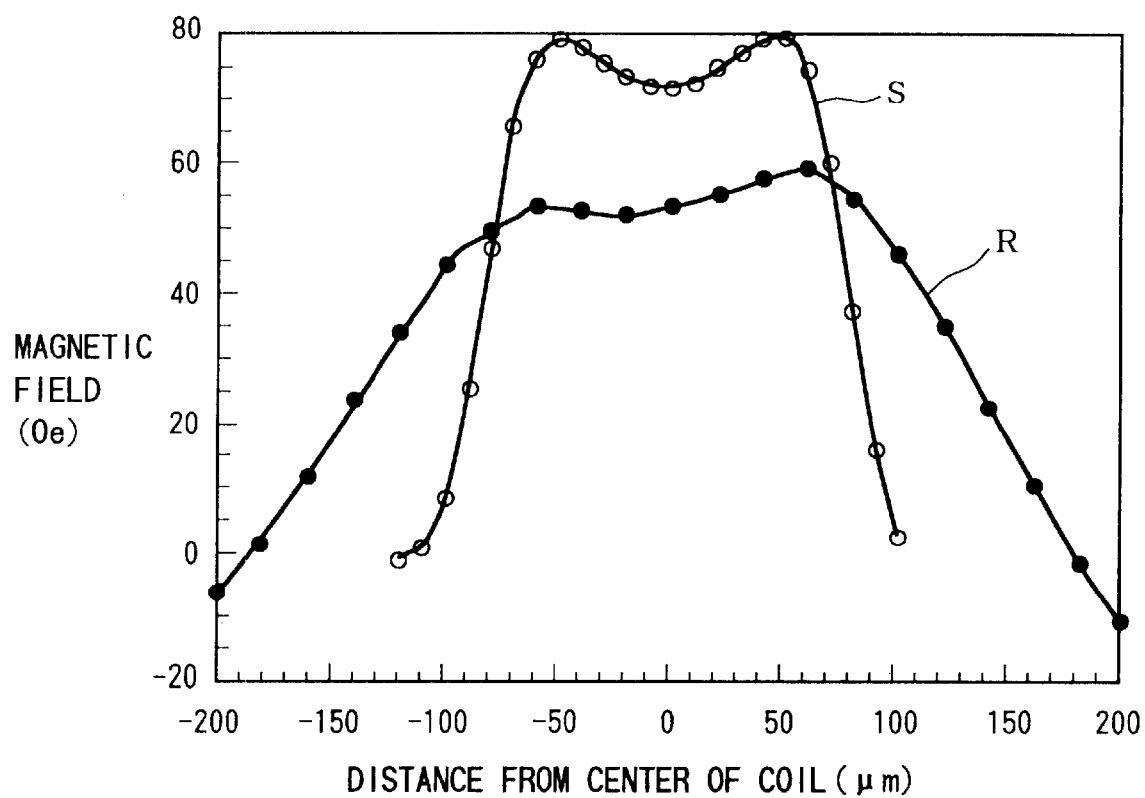
FIG. 6 is a view showing the intensity of the magnetic field above a magnetic coil at a distance of 40 μm plotted with respect to the distance from the center of the magnetic coil according to the embodiment.

The magnetic field intensities generated at positions 40 μm above the heads were measured when supplying a current of 100 mA to the thin film coils in the magnetic heads according to the present invention and the related art. The results are shown in FIG. 6. In FIG. 6, the abscissa represents the distance from the coil center portion, and the ordinate represents the magnetic field intensity.

The magnetic field of the magnetic head S according to the present invention is stronger than the magnetic field of a magnetic head R according to the related art, the magnetic field profile was narrower, the magnetic field acted so that a magnetic flux generated from the lower first magnetic core center portion was absorbed into the upper second magnetic core, and the magnetic field was concentrated at the center, thus the efficiency of the generation of magnetic field could be raised.

Second Embodiment

The optical disk drive according to the present embodiment is an MD or other optical disk drive in which the magnetic field modulation use magnetic head and the optical pickup device are arranged facing each other sandwiching the optical disk therebetween.

Figure 7:
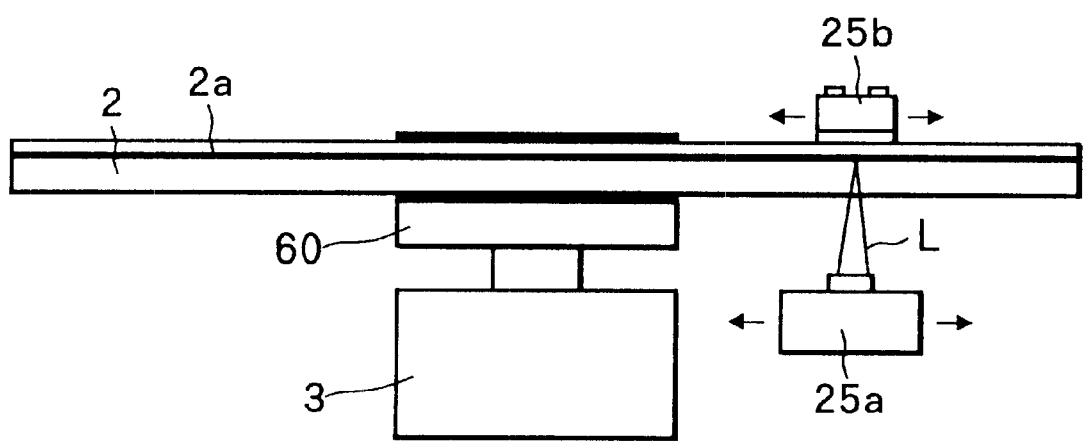
FIG. 7 is a schematic view of the configuration of a magneto-optic disk drive according to a second embodiment.

The structure of the optical disk drive according to the present embodiment is substantially the same as that of FIG. 1 of the first embodiment except the magnetic field modulation use magnetic head and the optical pickup device are arranged facing each other while sandwiching the optical disk therebetween. A schematic view of the configuration is shown in FIG. 7.

A magneto-optic disk 2 formed with the magneto-optic recording layer 2a is fixed to a disk table 60 driven to rotate by the spindle motor 3. By driving the spindle motor 3 to rotate, the magneto-optic disk is rotated at a predetermined speed.

An optical pickup device 25a and a magnetic field modulation use magnetic head 25b are arranged facing each other while sandwiching the magneto-optic recording layer 2a of the magneto-optic disk 2 therebetween.

The optical pickup device 25a is arranged at for example a side further away from the magneto-optic, recording layer 2a of the magneto-optic disk 2, while the magnetic field modulation use magnetic head 25b is arranged on the magneto-optic recording layer 2a side of the magneto-optic disk 2.

In the optical disk drive according to the present embodiment, the optical pickup device part, recording and playback of information with respect to the magneto-optic disk, etc. are similar to those of the first embodiment.

Figure 8:
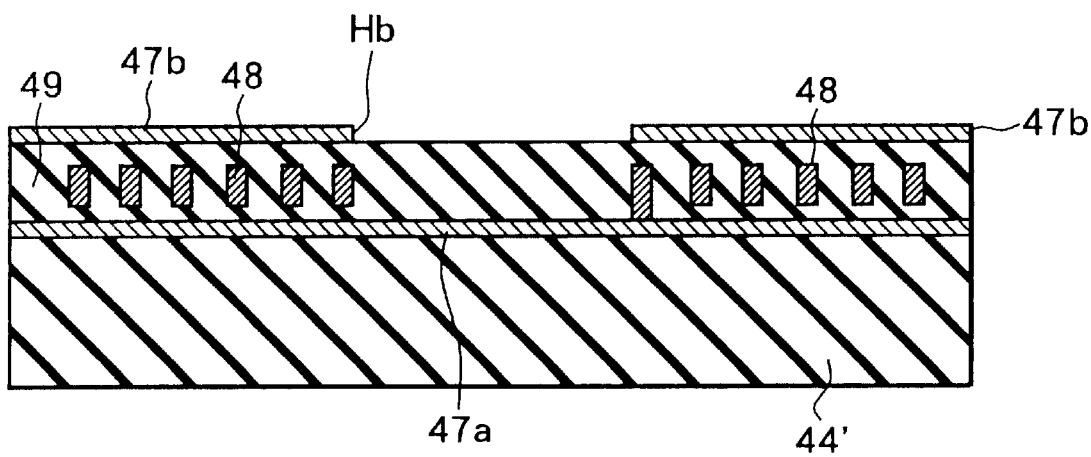
FIG. 8 is a sectional view of the configuration of a magnetic coil of a magnetic head portion according to the second embodiment.
Figure 9:
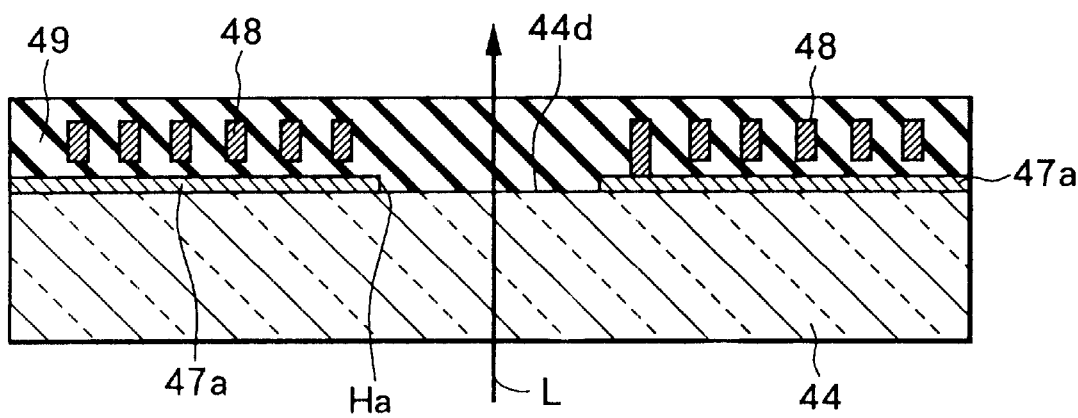
FIG. 9 is a sectional view of the configuration of a magnetic coil of a magneto-optic head portion according to the related art.

FIG. 8 is a sectional view showing enlarged the magnetic field modulation use magnetic head 25b part.

For example, a spiral-shaped thin film coil 48 is formed on the main surface of a coil supporting substrate 44' comprised of a transparent or opaque material facing the magneto-optic disk 2 while covered by the insulation layer 49.

Further, a first magnetic core 47a is formed below the thin film coil 48 on the coil supporting substrate 44, while the second magnetic core 47b is formed above the thin film coil 48.

The first magnetic core 47a is structured to act also as the electrode takeout portion from the inner circumferential end portion of the spiral-shaped thin film coil 48.

The thin film coil 48 has a center hole. A aperture portion Hb is formed at this center hole in the second magnetic core 47b. The aperture portion is not always necessary in the first magnetic core 47a.

The first and second magnetic cores (47a, 47b), thin film coil 48, and insulation film 49 can be made by materials similar to those used in the first embodiment and can be formed in the same way as the first embodiment.

Note that it is also possible to form a bonding layer such as a Cr film for improving the adhesion of the first magnetic core 47a to the coil supporting substrate 44'.

According to the magnetic field modulation use magnetic head according to the present embodiment, since the magnetic cores (the first magnetic core 47a and the second magnetic core 47b) are provided above and below the magnetic field generation coil (thin film coil 48), the efficiency of the magnetic circuit rises, it is possible to apply a magnetic field to the recording layer of the optical disk with a low power consumption and a high efficiency, and the disconnection of the magnetic field generation coil due to heat generation can be prevented.

Further, by using the magnetic field modulation use magnetic head, it is possible to construct an optical pickup device and an optical disk drive which have a higher efficiency of the magnetic circuit and can apply a magnetic field to the recording layer of the optical disk with a low power consumption and a high efficiency.

The present invention is not limited to these embodiments.

For example, the thin film coil acting as the magnetic field generation coil can have a dual layer structure comprising an upper layer coil and a lower layer coil having spiral shapes. In this case, a structure can be employed in which for example an inside end of the upper layer coil and the inside end of the lower layer coil are connected and in which a current Is supplied to an outside end of the upper layer coil and the outside end of the lower layer coil.

Further, while the first and second embodiments employed a structure forming an insulation layer also in the center hole region of the thin film coil, it is also possible to eliminate the insulation film in this region.

Further, the optical disk from which or to which data can be played back or recorded by the magneto-optic disk drive of the embodiments is not limited to a magneto-optic disk. A phase variation type optical disk utilizing phase variation or a read (play back) only optical disk can also be handled.

When the magneto-optic disk drive records an information signal on a phase change type optical disk, the head emits a laser beam to the recording layer of the phase change type optical disk to record the information signal utilizing the phase change of this recording layer. When playing back the information signal from the phase change type optical disk, the head emits a laser beam to the recording layer of the phase change type optical disk to obtain a playback signal from the difference of the returning light due to the state of the recording layer.

Further, when this magneto-optic disk drive plays back an information signal from a read only optical disk, the head emits a laser beam to the signal recording layer of the read only optical disk and detects the returning light to acquire the playback signal.

Further, the optical disk drive of the present invention can be preferably applied to a near field optical disk drive, an optical hard disk drive, or other optical disk drive in which the optical disk and the optical lens are arranged so that the distance therebetween becomes about 200 nm or less or an optical disk drive in which the magnetic field modulation use magnetic head and the optical pickup device are arranged facing each other while sandwiching the optical disk therebetween.

Other various modifications can be made within a range not changing the gist of the present invention.

Summarizing the effects of the present invention, according to the magneto-optical element or magnetic field modulation use magnetic head provided with the magnetic coil part of the present invention, due to the provision of the magnetic field generation coil and the magnetic cores above and below this as the magnetic field generating means, the efficiency of the magnetic circuit rises, it is possible to apply a magnetic field to the recording layer of the optical disk with a low power consumption and a high efficiency, there is no reduction of the efficiency of the generated magnetic field due to the heat of the thin film coil particularly at the time of a high frequency, and disconnection of the magnetic field generation coil due to heat generation can be prevented.

Further, by using the magneto-optical element or magnetic field modulation use magnetic head, it is possible to construct a magneto-optical element, optical pickup device, and optical disk drive which have a higher efficiency of the magnetic circuit and can apply a magnetic field to the recording layer of the optical disk with a low power consumption and a high efficiency.

What is claimed is:

1. A magnetic field modulation use magnetic head for applying a magnetic field to a magneto-optic recording layer of a magneto-optic recording medium, comprising:

a magnetic field generation coil arranged so that a direction of a recording current is substantially parallel to a plane of said magneto-optic recording layer;

a first magnetic core formed at a side of said magnetic field generation coil opposite to said magneto-optic recording medium;

a second magnetic core formed at a side of said magnetic field generation coil the same as said magneto-optic recording medium;

said first and second magnetic cores surrounding the magnetic field generation coil and connected magnetically at an outer circumferential portion of the magnetic field generation coil; and aperture portions formed in said first magnetic core and said second magnetic core at a center region of said magnetic field generation coil such that a diameter of the aperture portion of said second magnetic core is larger than a diameter of the aperture portion of said first magnetic core.

2. A magneto-optical element used in at least recording or playback of information with respect to a magneto-optic recording layer of a magneto-optic recording medium, comprising:

a lens configured to focus light emitted to the magneto-optic recording layer of the magneto-optic recording medium; and a magnetic field generating mechanism formed at a surface of said lens facing said magneto-optic recording medium, said magnetic field generating mechanism having, a magnetic field generation coil arranged substantially parallel to the magneto-optic recording medium, a first magnetic core formed at a side of said magnetic field generation coil opposite to said magneto-optic recording medium, a second magnetic core formed at a side of said magnetic field generation coil the same as said magneto-optic recording medium;

said first and second magnetic cores surrounding the magnetic field generation coil and connected magnetically at an outer circumferential portion of the magnetic field generation coil; and aperture portions formed in said first magnetic core and said second magnetic core at a center region of said magnetic field generation coil serving as an optical axis of the light emitted to said magneto-optic recording medium such that a diameter of the aperture portion of said second magnetic core is larger than a diameter of the aperture portion of said first magnetic core.

3. A magneto-optical element as set forth in claim 2, wherein:

said magnetic field generating means is formed on a supporting substrate made of an optical member constituting said lens, and said supporting substrate is fixed to an optical member having a spherical shape constituting said lens.

4. A magneto-optical element as set forth in claim 2, wherein said lens is constituted by a group of a plurality of lenses arranged on an optical axis of the light emitted to said magneto-optic recording medium.

5. A magneto-optical element as set forth in claim 4, wherein said lens is constituted by a group of two lenses arranged on the optical axis of the light emitted to said magneto-optic recording medium.

6. A magneto-optical element as set forth in claim 2, wherein part of said first magnetic core and part of said second magnetic core are magnetically connected.

7. An optical pickup device used at least in recording or playback of information with respect to a magneto-optic recording layer of a magneto-optic recording medium, comprising;

a light source configured to emit light toward the magneto-optic recording medium;

a magneto-optical element having, a lens which is arranged on an optical axis of the light emitted from said light source and which focuses said light to the magneto-optic recording layer of said magneto-optic recording medium, and a magnetic field generating mechanism including, a magnetic field generation coil arranged substantially parallel to said magneto-optic recording medium, a first magnetic core formed at a side of said magnetic field generation coil opposite to said magneto-optic recording medium, and a second magnetic core formed at a side of said magneto-optic generation coil the same as said magneto-optic recording medium and formed at a surface of said lens facing said magneto-optic recording medium;

said first and second magnetic cores surrounding the magnetic field generation coil and connected magnetically at an outer circumferential portion of the magnetic field generation coil;

aperture portions formed in said first magnetic core and said second magnetic core at a center region of said magnetic field generation coil serving as an optical axis of the light emitted to said magneto-optic recording medium such that a diameter of the aperture portion of said second magnetic core is larger than a diameter of the aperture portion of said first magnetic core; and a light receiving element configured to receive a returning light reflected at said magneto-optic recording layer.

8. An optical pickup device as set forth in claim 7, wherein:

said magnetic field generating means is formed on a supporting substrate made of the optical member constituting said lens, and said supporting substrate is fixed to an optical member having a spherical shape constituting said lens.

9. An optical pickup device as set forth in claim 7, wherein said lens is constituted by a group of a plurality of lenses arranged on the optical axis of the light emitted to said magneto-optic recording medium.

10. An optical pickup device as set forth in claim 9, wherein said lens is constituted by a group of two lenses arranged on the optical axis of the light emitted to said magneto-optic recording medium.

11. An optical pickup device as set forth in claim 7, wherein part of said first magnetic core and part of said second magnetic core are magnetically connected.

12. An optical disk drive for at least recording or playing back information with respect to a magneto-optic recording layer of a magneto-optic recording medium, comprising:

a rotation driving mechanism configured to drive the magneto-optic recording medium to rotate;

a light source configured to emit light toward said magneto-optic recording medium;

a magneto-optical element having, a lens which is arranged on an optical axis of the light emitted from said light source and which focuses said light to the magneto-optic recording layer of said magneto-optic recording medium, and a magnetic field generating mechanism including, a magnetic field generation coil arranged substantially parallel to said magneto-optic recording medium, a first magnetic core formed at a side of said magnetic field generation coil opposite to said magneto-optic recording medium, and a second magnetic core formed at a side of said magneto-optic generation coil the same as said magneto-optic recording medium and formed at a surface of said lens facing said magneto-optic recording medium;

said first and second magnetic cores surrounding the magnetic field generation coil and connected magnetically at an outer circumferential portion of the magnetic field generation coil;

aperture portions formed in said first magnetic core and said second magnetic core at a center region of said magnetic field generation coil serving as an optical axis of the light emitted to said magneto-optic recording medium such that a diameter of the aperture portion of said second magnetic core is larger than a diameter of the aperture portion of said first magnetic core;

a light receiving element configured to receive a returning light reflected at said magneto-optic recording layer; and a signal processing circuit configured to generate a predetermined signal on a basis of the returning light received by said light receiving element.

13. An optical disk drive as set forth in claim 12, further comprising:

an adjustment mechanism for adjusting a relative position of said magneto-optical element with respect to said magneto-optic recording medium and a control unit for controlling said adjustment mechanism according to the signal created in said signal processing circuit.

14. An optical disk drive as set forth in claim 12, wherein:

said magnetic field generating means is formed on a supporting substrate made of an optical member constituting said lens and said supporting substrate is fixed to an optical member having a spherical shape constituting said lens.

15. An optical disk drive as set forth in claim 12, wherein said lens is constituted by a group of a plurality of lenses arranged on the optical axis of the light emitted to said magneto-optic recording medium.

16. An optical disk drive as set forth in claim 15, wherein said lens is constituted by a group of two lenses arranged on the optical axis of the light emitted to said magneto-optic recording medium.

17. An optical disk drive as set forth in claim 12, wherein part of said first magnetic core and part of said second magnetic core are magnetically connected.

* * * * *